2 Sheets—Sheet 1.

J. A. MOORE.

Cabinet Desk.

No. 9,402. Reissued Oct. 12, 1880.

WITNESSES:

James B. Lizius,

R. P. Daggett.

INVENTOR:

Joseph A. Moore,

PER

C. Bradford,

ATTORNEY.

N. PETERS, PHOTO-LITHOGRAPHER, WASHINGTON, D. C.

J. A. MOORE.
Cabinet Desk.

No. 9,402. Reissued Oct. 12, 1880.

*WITNESSES:*

James B. Lizius,
R. P. Daggett

*INVENTOR:*

Joseph A. Moore,
PER
C. Bradford,
ATTORNEY.

N. PETERS, PHOTO-LITHOGRAPHER, WASHINGTON, D. C.

UNITED STATES PATENT OFFICE.

JOSEPH A. MOORE, OF INDIANAPOLIS, INDIANA.

CABINET-DESK.

SPECIFICATION forming part of Reissued Letters Patent No. 9,402, dated October 12, 1880.

Original No. 199,089, dated January 8, 1878. Application for reissue filed February 6, 1880.

*To all whom it may concern:*

Be it known that I, JOSEPH A. MOORE, of the city of Indianapolis, county of Marion, and State of Indiana, have invented certain new and useful Improvements in Cabinet-Desks, of which the following is a specification, reference being had to the accompanying drawings, which are made a part hereof, and on which similar letters of reference indicate similar parts, and of which—

Figure 1:
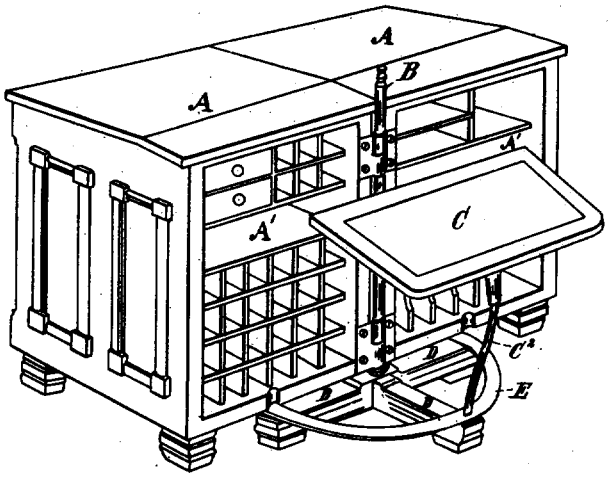
Figure 2:
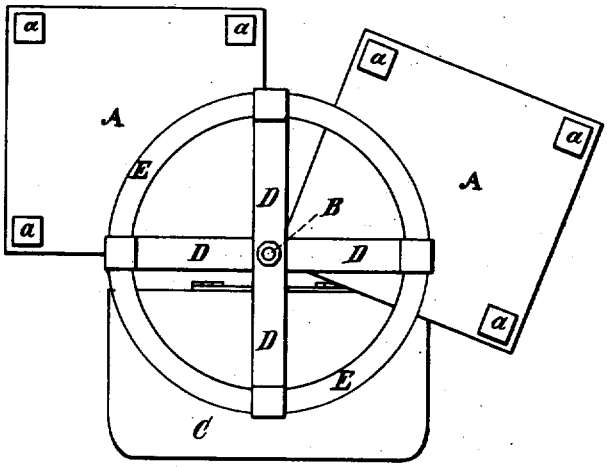
Figure 3:
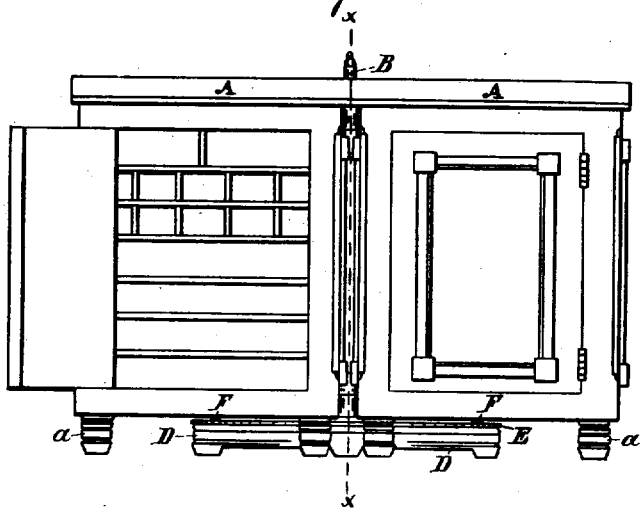
Figure 4:
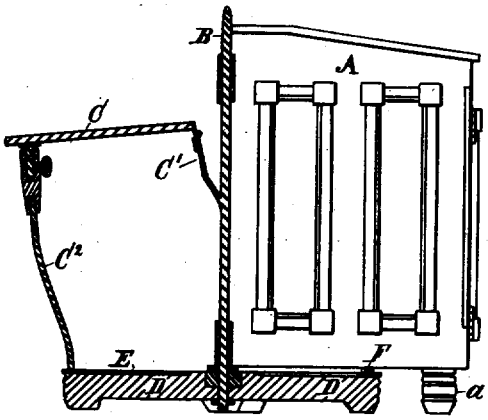

Figure 1 is a perspective view of an open desk embodying my invention; Fig. 2, an under-side plan, showing the foot or base and the circular track thereon, with the nearly-open sections or wings and writing-table above; Fig. 3, a rear elevation, showing more clearly how the desk is arranged for the use of persons when they desire to stand; and Fig. 4, a partially-sectional view on the dotted line *x x*, showing more clearly than the others how the writing-table is attached and supported, and also one of the casters or trucks which support the sections or wings of the desk, and on which they move when being changed from an open to a closed position, or vice versa.

The principal objects of my invention are to provide a convenient and commodious desk the front or main part of which can be closed at one operation and be locked with a single lock, and which can also be so closed without in any way disturbing the horizontal position of the writing-table or removing the papers or other matters lying thereon.

The objects are accomplished by constructing the desk of sections or wings vertically hinged together and provided with recesses for the reception of the writing-table when not in use, as will hereinafter be more fully explained.

Referring now to the drawings, the portions marked A represent the sections or wings, which constitute the principal portion of my improved desk; B, an upright shaft, to which the wings or sections of the desk, and also the writing-table, are attached, and on which said wings turn sufficiently to permit the desk to be changed from an open to a closed position, or vice versa; C, the writing-table; C′, an arm on the shaft B, by which the writing-table is attached thereto; D, a base or foot for the desk, composed, preferably, of crossed timbers, in which the upright shaft is set, and which preferably supports the entire weight of the desk proper; E, a circular track, which I usually put on said base to facilitate the movement of the wings and to conduce to their better support; F, one of a number of rollers or casters which are placed on the bottom of the wings and above the track when it is used. Instead of placing this circular track upon the base, as shown in the drawings, it may be divided into segments and attached to the bottom of the wings, in which case the rollers would be placed upon the arms of the base, and the track would then run upon them, instead of they upon the track, which construction may perhaps be regarded as the superior in some instances; and in large desks it may be found best to set the feet *a a a* under the corners of the wings or sections, in order to give them a firmer support than is afforded by the crossed feet and circular track, in which case said feet will be provided with the casters or rollers. (Not shown.)

Each of the wings is provided with a suitable recess, A′ A′, large enough to receive its proper portion of the writing-table. This construction permits the closing of the desk at any time without disturbing the horizontal position of the writing-table or displacing the papers that may be lying thereon. To those who have frequent occasion to close their desks this feature will be found of great value, as it effects a considerable saving of time.

Another feature of my invention is the utilization from the rear of the top wings as standing-desks. A large-sized desk (such as is shown) on this plan gives ample room for the convenient use of three persons, as the depth of the wings gives sufficient room in the back as well as the front sides for the reception of books, papers, &c. This feature will, however, probably be omitted in some of the desks, especially the smaller sizes.

A standard, $C^2$, is placed under the front edge of the writing-table for the better support thereof. The top of this standard is so constructed, in connection with an appropriate attachment to the under side of the writing-table, that said table may be adjusted in position to suit the convenience of the person using the desk.

The rollers or casters F sustain all the weight of the wings, leaving as the function of the hinges the connecting together of said wings only.

Having thus fully described my said invention, what I claim as new, and desire to secure by Letters Patent, is—

1. A cabinet-desk consisting of vertically-hinged wings extending from top to bottom of the desk and a writing-table which remains in a substantially-horizontal position, said wings being provided with recesses which entirely inclose said writing-table when the desk is closed, substantially as and for the purposes set forth.

2. The combination, in a cabinet-desk, of the wings, an upright shaft, B, to which said wings are pivoted, and a table attached to said shaft, substantially as set forth.

3. In combination with a desk composed of upright wings hinged or pivoted together, a circular track, E, substantially as and for the purposes set forth.

4. A cabinet-desk consisting exclusively of sections vertically hinged together, having appropriate supporting-feet and table-recesses, and a separately-constructed writing-table attached thereto, which remains in a horizontal, or nearly horizontal, position as well when the desk is closed as when it is open, substantially as and for the purposes set forth.

In witness whereof I have hereunto set my hand and seal, at Indianapolis, Indiana, this 2d day of February, A. D. 1880.

JOSEPH A. MOORE. [L. S.]

In presence of—
P. J. CARLETON,
C. BRADFORD.